Oct. 23, 1962

F. W. MELLBERG 3,059,533

ZOOM LENS

Filed Nov. 23, 1959

INVENTOR.
Frank W. Mellberg
BY
Robert F. Miehle Jr.
Atty.

Oct. 23, 1962 F. W. MELLBERG 3,059,533
ZOOM LENS
Filed Nov. 23, 1959 3 Sheets-Sheet 2
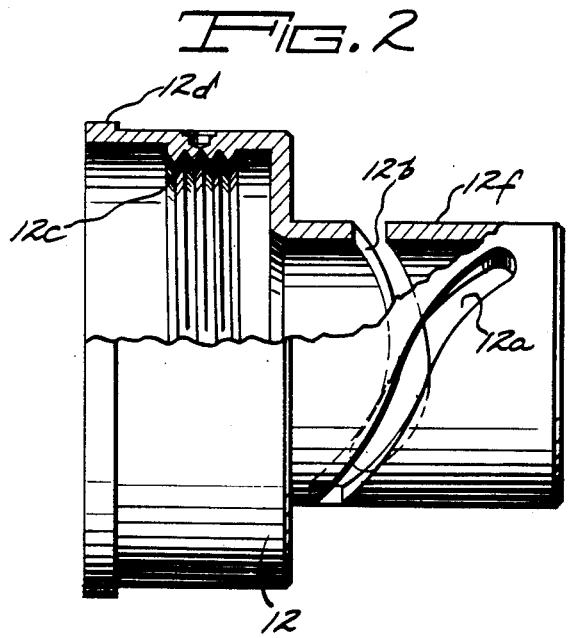
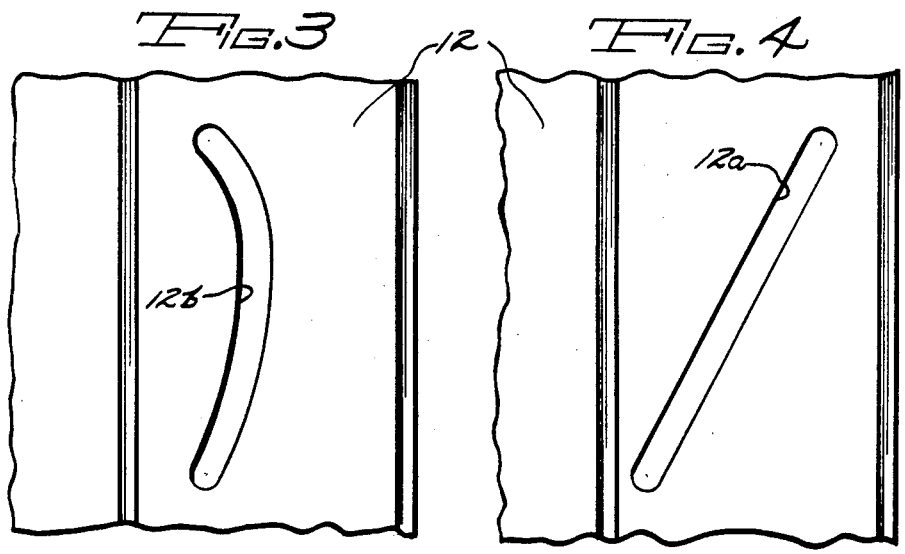
INVENTOR.
Frank W. Mellberg
BY
Robert F. Miehle, Jr.
Atty.

Oct. 23, 1962  F. W. MELLBERG  3,059,533
ZOOM LENS
Filed Nov. 23, 1959  3 Sheets-Sheet 3
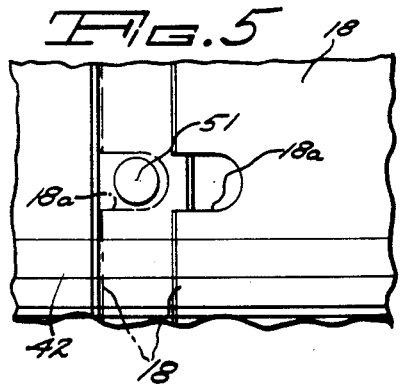
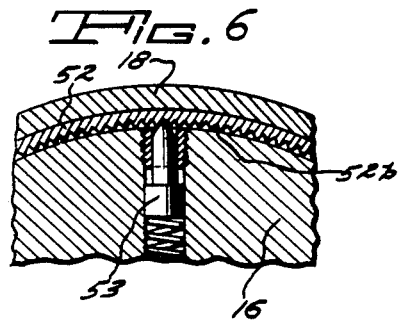
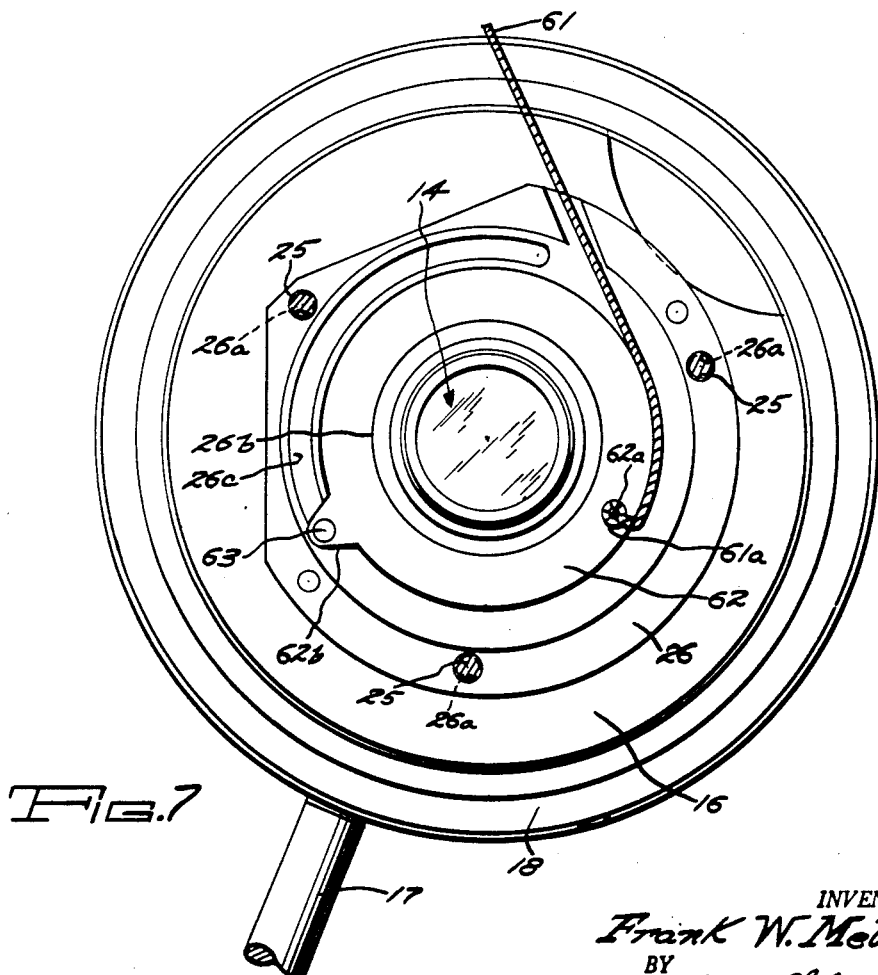
INVENTOR.
Frank W. Mellberg
BY
Robert F. Mickley
Atty.

3,059,533
ZOOM LENS

Frank W. Mellberg, Chicago, Ill., assignor to Bell & Howell Company, Chicago, Ill., a corporation of Illinois
Filed Nov. 23, 1959, Ser. No. 854,732
11 Claims. (Cl. 88—57)

This invention relates to a zoom lens, and more particularly to a zoom lens mount.

An object of the invention is to provide a zoom lens of the focusing type together with an audible signal operable when the focus adjustment is not hyperfocal.

Another object of the invention is to provide a zoom lens having a rotatable zooming member together with a capstan rotated thereby to actuate a cable coupling the zoom lens to a zoom viewfinder.

Another object of the invention is to provide a zoom lens in which a rotatable actuating member is slidable between a first position locking a focusing component in a hyperfocal position and a position freeing the focusing component together with audible ratchet means operable when the actuating member is in its first position.

A complete understanding of the invention may be obtained from the following detailed description of a zoom lens forming a specific embodiment thereof, when read in conjunction with the appended drawings, in which:

FIG. 2 is a partially sectional, partially elevational view of a zoom sleeve of the zoom lens of FIG. 1;

FIG. 3 is an enlarged, developed view of one cam slot of the zoom sleeve of FIG. 2;

FIG. 4 is an enlarged, developed view of a second cam slot of the zoom sleeve of FIG. 2;

FIG. 5 is an enlarged, fragmentary, top plan view of the zoom lens and taken along line 5—5 of FIG. 1;

FIG. 6 is an enlarged, fragmentary, vertical sectional view taken along line 6—6 of FIG. 1;

FIG. 7 is a view taken along line 7—7 of FIG. 1.

Figure 1:
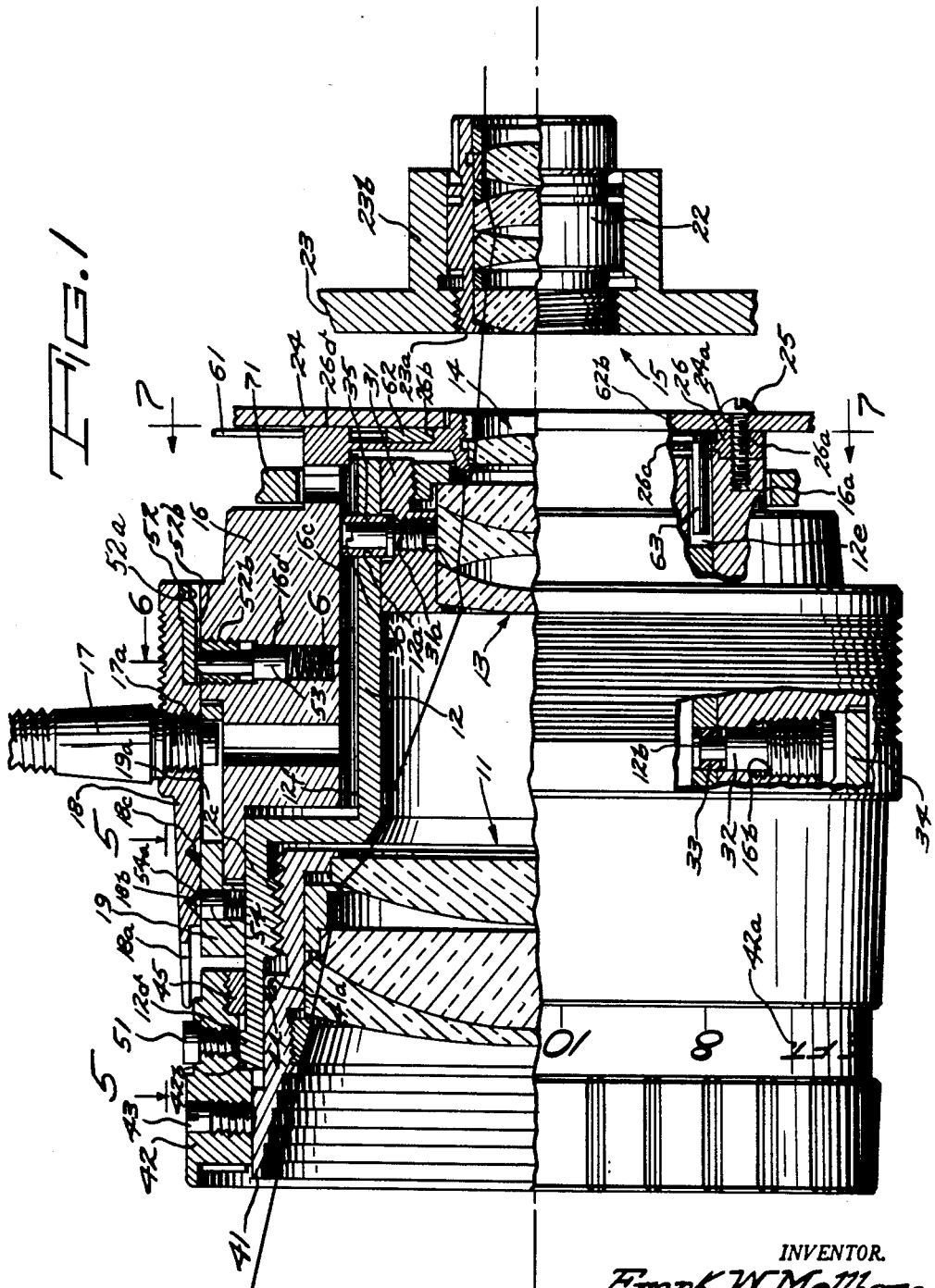
FIG. 1 is a fragmentary, partially sectional, partially elevational view of a zoom lens and camera forming one embodiment of the invention.

The invention provides a zoom lens for a camera in which there is a zoom sleeve slidable and rotatable on a fixed sleeve carrying a fixed component, and the zoom sleeve carries a focusing component adjustably and a zoming component slidably therein. An actuating sleeve splined to the zoom sleeve and rotatable on the fixed sleeve may be slid between a first position locking the focusing component in its hyperfocal position and a second position freeing the focusing component for adjustment relative to the zoom sleeve. Preferably the actuating sleeve and the fixed sleeve have audible signal means operable only when the actuating sleeve is in its second position and is rotated for zoom. Also, there may be provided a viewfinder zooming capstan mounted rotatably on the fixed sleeve and splined to the zooming sleeve.

Referring now in detail to the drawings, the zoom lens shown in FIG. 1 includes a focusing lens member 11 carried by and adjustable relative to a rotatable zoom sleeve 12, a zooming lens member 13 slidable and rotatable relative to the sleeve 12, a stationary component 14 forming an afocal lens system of variable magnification with the members 11 and 13, and a stationary rear object 15. This optical system is disclosed and claimed in co-pending application Serial No. 861,957, filed December 24, 1959, by Arthur Cox and Walter J. Johnson and assigned to the same assignee as the instant application. In zooming from the extreme telephoto position as shown in FIG. 1 to the extreme wide angle, the zoom sleeve 12 is rotated relatively to a fixed sleeve 16 by a handle 17 fixed to actuating sleeve 18 splined to the zoom sleeve by a splining sleeve 19. This causes the zooming lens member 13 to be moved at a linear rate of speed to the left, as viewed in FIG. 1, relative to the stationary lens member 14. This rotation of the zoom sleeve also causes the zoom sleeve and the focusing lens member 11 first to be moved to the left and then to the right relative to the stationary lens member 14 to eliminate slight changes in focus caused by the movement of the zoom lens member so that a constant back focus of the entire lens system is maintained for all adjustments of the lens system. This axial movement of the zoom sleeve and the focusing member 11, which is fixed to the zoom sleeve during zooming, is small in comparison to the axial movement of the zooming lens member 13, being just sufficient for back focus compensation.

The objective 15 is mounted in a lens cell 22 threaded into a tapped bore 23a in a stationary wall or plate 23 of the camera of which the zoom lens forms a part. The wall has a sleeve-like mounting boss 23b. The fixed sleeve 16 is mounted on a fixed mounting plate 24 of the camera is a stationary position by screws 25 projecting through bores 24a in the plate 24 and bores 26a in a spacing washer or lens cell 26 into tapped bores 16a in the fixed sleeve 16.

The zooming movement of the negative zooming lens member 13 is achieved by pin-and-slot connections between the zooming sleeve 12 and the fixed sleeve 16 and between a cell 31 mounting the zooming member 13 and the sleeves 12 and 16. The axial movement of the zooming sleeve 12 is effected by a slot 12b and a pin 32 threaded into tapped bore 16b having a rotatable wear sleeve 33 thereon, the bore 16b being covered by a plug 34. The movement of the zooming lens member 13 is the resultant of the small axial movement of the sleeve 12 and the large linear movement of the cell 31 along the sleeve 12 which is caused by a pin 35 threaded into tapped bore 31a and carrying a rotatable wear sleeve 36 extending through slot 12a in the sleeve 12 into a longitudinal splining groove 16c in the fixed sleeve 16. Thus, the cell 31 is splined to the sleeve 16 and is movable linearly along the sleeve 12 by the pin-and-slot connection therebetween.

During zooming (changes in the magnification), the focusing member 11 is not moved relative to the zoom sleeve 12. However, to focus precisely for different object distances, a lens cell 41 carrying the lens member 11 is adjustably threaded into an enlarged, tapped portion 12c of the zoom sleeve and may be rotated manually relative to the zoom sleeve by a knurled sleeve 42 fixed to the cell 41 by set screw 43. Wire ring 44 is carried in groove 41a to provide friction. A focus scale 42a is provided on the sleeve 42. The limits of focusing movement of the member 11 are determined by stop ring 45 and shoulder 42b bracketing collar 12d of the sleeve 12.

The actuating sleeve 18 is slidable on the splining sleeve 19, and is splined thereto by a pin portion 17a of the handle 17 projecting into a longitudinal splining slot 19a in the sleeve 19. The sleeve 18 has a locking slot or notch 18a aligned with and designed to bracket a pin 51 when the lens member 11 is in its hyperfocal position of adjustment relative to the sleeve 12. The sleeve 18 is manually slidable between this focus locking position and the retracted or non-locking position in which it is shown in FIG. 1, the locking position being shown in broken lines in FIG. 5. When the sleeve 18 locks the lens member 11 in its hyperfocal position, an untoothed or clearance portion 52a of a clicker bushing 52 is laterally aligned with a spring pressed clicker detent 53 carried in bore 16d and no noise occurs during zooming. When the sleeve 18 is in its retracted position, the detent 53 is pressed by spring 54 against the then aligned toothed or clicker portion 52b of the bushing and an audible clicking or warning signal is given during zooming. This apprises the user that the focus is not hyperfocal. A spring pressed detent 54 carried by sleeve 19 holds the sleeve 18 by spring force in either the locking position or the retracted position, tapered sockets 18b and 18c being provided in the sleeve 18 for receiving tapered end 54a of the pin. The sleeve 19 is rigidly fixed to the zoom ring 12 by suitable means such as a set screw (not shown).

To provide a coupling for the viewfinder of the camera to zoom the viewfinder in synchronism with the objective zoom lens described above, a flexible cable 61 (FIGS. 1 and 7) is secured at one end to a capstan ring 62 by an enlarged end 61a fitting into undercut socket 62a. The capstan ring is journaled on a boss 26b of the cell 26 and is held against axial movement by annular web 26c and the mounting plate 24. The ring 62 is splined to the boom sleeve 12 by a pin 63 riveted to radial lug 62b and fitting slidably into splining slot or notch 12e in the end of the zoom sleeve 12. This spline connection causes the capstan ring to be rotated with the zoom sleeve during zooming and the capstan winds the cable 61 thereon, or unwinds it, depending on the direction of rotation of the zoom sleeve 12, to zoom the viewfinder along with the main zoom objective. The pin 63 projects through arcuate slot 26c in the cell 26 which permits the capstan ring 62 to be rotated with sleeve 26 through the zooming range. The viewfinder and the coupling structure are disclosed and claimed in co-pending applications Serial No. 859,379, filed December 14, 1959, by Walter L. Linke, and Serial No. 854,640, filed November 23, 1959, by Howard W. Graves and both assigned to the same assignee as the instant application.

The fixed mounting sleeve 16 projects through exterior housing wall 71 of the camera and abuts thickened rim portion 26d of the cell. The zoom ring 12 has an elongated, reduced portion 12f rotatable and slidable in the sleeve 16.

While the invention is thus described, it is not wished to be limited to the precise details described, as changes may be readily made without departing from the spirit of the invention.

What is claimed is:

1. In a lens mounting device, a fixed mounting sleeve, a zoom sleeve slidable along and rotatable in the fixed sleeve, a zoom lens cell in the zoom sleeve, means for moving the zoom sleeve and the zoom lens cell relative to one another as the zoom sleeve is rotated, a focusing lens cell carried in the zoom sleeve adjustably for focusing, an actuating sleeve rotatable on the fixed sleeve for rotating the zoom sleeve and splined to the zoom sleeve for movement between a first position locking the focusing lens cell against focusing movement relative to the zoom sleeve and a position permitting focusing movement of the focusing lens cell relative to the zoom sleeve, and audible signal means operating during rotation of the actuating sleeve when the actuating sleeve is not in said first position.

2. In a lens mounting device, a fixed sleeve having a splining groove extending therealong, a zoom sleeve slidable along and rotatable in the fixed sleeve and having a first cam slot therein and a second cam slot therein, a zoom lens cell in the zoom sleeve and having a pin projecting through the first cam slot into the splining groove, a pin fixed to the fixed sleeve and projecting into the second cam slot, a focusing lens cell carried in the zoom sleeve adjustably for focusing, an actuating sleeve rotatable on the fixed sleeve for rotating the zoom sleeve and splined to the zoom sleeve for movement between a first position locking the focusing lens cell against focusing movement relative to the zoom sleeve and a position permitting focusing movement of the focusing lens cell relative to the zoom sleeve, and clicker means operating during rotation of the actuating sleeve when the actuating sleeve is not in said first position.

3. In a camera, a wall having an opening, a fixed mounting sleeve aligned with the opening and fixed to the wall, a zooming sleeve rotatable in and slidable along the fixed mounting sleeve and having an end slot therein, a capstan ring rotatably mounted on the fixed mounting sleeve and held against movement along the fixed mounting sleeve, a pin fixed to the capstan ring and extending into the slot to spline the ring to the zooming sleeve, and means on said capstan permitting it to drive other means located exteriorly thereof in accordance with the degree of rotation imparted to said zooming sleeve.

4. The camera of claim 3 wherein the fixed mounting sleeve includes a lens mount at the end thereof adjacent to the wall, the lens mount having a reduced end portion mounting the capstan ring rotatably thereon and also having an arcuate slot through which the pin extends and permitting revolving of the pin by the zoom sleeve.

5. In a zoom lens including an axially movable zooming component and an axially movable focusing component, the combination therewith of a fixed mount, a zoom mount rotatable relative to the fixed mount, means for moving the zooming component along the zoom mount, a focusing mount carrying the focusing component and adjustably mounted on the zoom mount, a manually operable locking sleeve splined to the zoom mount and movable to a position locking the focusing mount to the zoom mount in a hyperfocal position, and a detent member on the fixed mount, the locking sleeve having a toothed portion adapted to clickingly engage the detent member when the sleeve is rotated and is not in said position locking the focusing mount to the zoom mount in the hyperfocal position.

6. In a zoom lens including an axially movable zooming component and an axially movable focusing component, the combination therewith of a fixed mount, a zoom mount rotatable relative to the fixed mount, means for moving the zooming component with the zoom mount, a focusing mount carrying the focusing component and adjustably mounted on one of said mounts, manually operable means for locking the focusing mount in a predetermined position on said one mount, and audible indicating means operable by the zoom mount when the focusing mount is not in said predetermined position.

7. The zoom lens of claim 6 in which the audible indicating means includes a spring pressed detent carried by the fixed mount and the manually operable means includes an actuating sleeve slidable on the zoom sleeve between a first position and locking the focusing mount in said predetermined position and a second position permitting adjustment of the focusing mount, the actuating sleeve being provided with a clicking portion for engaging the detent when the actuating sleeve is in said second position thereof and also having a clearance portion for receiving the detent when the actuating sleeve is in said first position.

8. In a zoom lens, a fixed sleeve having a splining slot located internally thereof, a zoom sleeve rotatable in and slidable along the fixed sleeve and having first and second cam slots, the zoom sleeve also having a tapped portion, a first lens cell rotatable in and slidable along the zoom sleeve adjacent to the first cam slot, a follower pin extending through the first cam slot and into the splining slot and fixed to the first lens cell, a second follower pin fixed to the fixed sleeve and projecting into the second cam slot, a focusing lens cell having a threaded portion adjustably threaded into the tapped portion in the zoom sleeve and having a projection, a splining sleeve slidable and rotatable on the fixed sleeve and fixed to the zoom sleeve, the splining sleeve having a splining slot extending therealong, an actuating sleeve slidable on the splining sleeve and having a projection projecting into the splining slot in the splining sleeve, the actuating sleeve having longitudinal spaced detent recesses on the inner face thereof, and a spring pressed detent carried by the splining sleeve for holding the actuating sleeve selectively in a forward position and a rear position, the actuating sleeve having a locking notch for interlocking with the projection on the focusing cell when the actuating sleeve is in its forward position.

9. In a zoom lens, a fixed sleeve having a splining slot located internally thereof, a zoom sleeve rotatable in and slidable along the fixed sleeve and having first and second cam slots, the zoom sleeve also having a tapped portion, a first lens cell rotatable in and slidable along the zoom sleeve adjacent to the first cam slot, a follower pin extending through the first cam slot and into the splining slot and fixed to the first lens cell, a second follower pin fixed to the fixed sleeve and projecting into the second cam slot, a focusing lens cell having a threaded portion adjustably threaded into the tapped portion in the zoom sleeve and having a radial projection, a splining sleeve slidable and rotatable on the fixed sleeve and fixed to the zoom sleeve, the splining sleeve having a splining slot extending therealong, an actuating sleeve slidable on the splining sleeve and having a projection projecting into the splining slot in the splining sleeve, the actuating sleeve having longitudinal spaced detent recesses on the inner face thereof, a spring pressed detent carried by the splining sleeve for holding the actuating sleeve selectively in a forward position and a rear position, the actuating sleeve having a locking notch for interlocking with the projection on the focusing cell when the actuating sleeve is in its forward position, and clicker means operable when the actuating sleeve is not in its forward position.

10. The zoom lens of claim 8 wherein the actuating sleeve has a plurality of inwardly projecting teeth extending a predetermined distance therealong, and a spring pressed clicker detent carried by the fixed sleeve in a position to engage the teeth of the actuating sleeve when the actuating sleeve is in its rear position.

11. In a zoom lens, a zoom sleeve, a fixed sleeve mounting the zoom sleeve slidably and rotatably, a focusing cell threadedly engaging the zoom sleeve and rotatable relative thereto for focusing, an actuating sleeve splined to the zoom sleeve, and pin-and-slot latching means operable in one position to spline the focusing cell to the zoom sleeve and operable when in a second position to permit rotation of the cell relative to the zoom sleeve, said pin-and-slot latching means including a pin on the focusing cell and a slot in the actuating sleeve, said actuating sleeve being adapted to be moved axially relative to said pin to release said latching means to allow said focusing cell to be rotated relative to the zoom sleeve, said actuating sleeve also being adapted to lock the focusing cell relative to the zoom sleeve when the pin-and-slot are engaged.

References Cited in the file of this patent

UNITED STATES PATENTS

| | | |
|---|---|---|
| 751,116 | Stark | Feb. 2, 1904 |
| 1,988,390 | Naumann | Jan. 15, 1935 |
| 2,136,149 | Nuchterlein | Nov. 8, 1938 |
| 2,245,212 | Mihalyi et al. | June 10, 1941 |
| 2,380,829 | Eddy | July 31, 1945 |